April 13, 1954 E. EBERHARD 2,675,474
TWO-TERMINAL SINE WAVE OSCILLATOR
Filed May 14, 1949
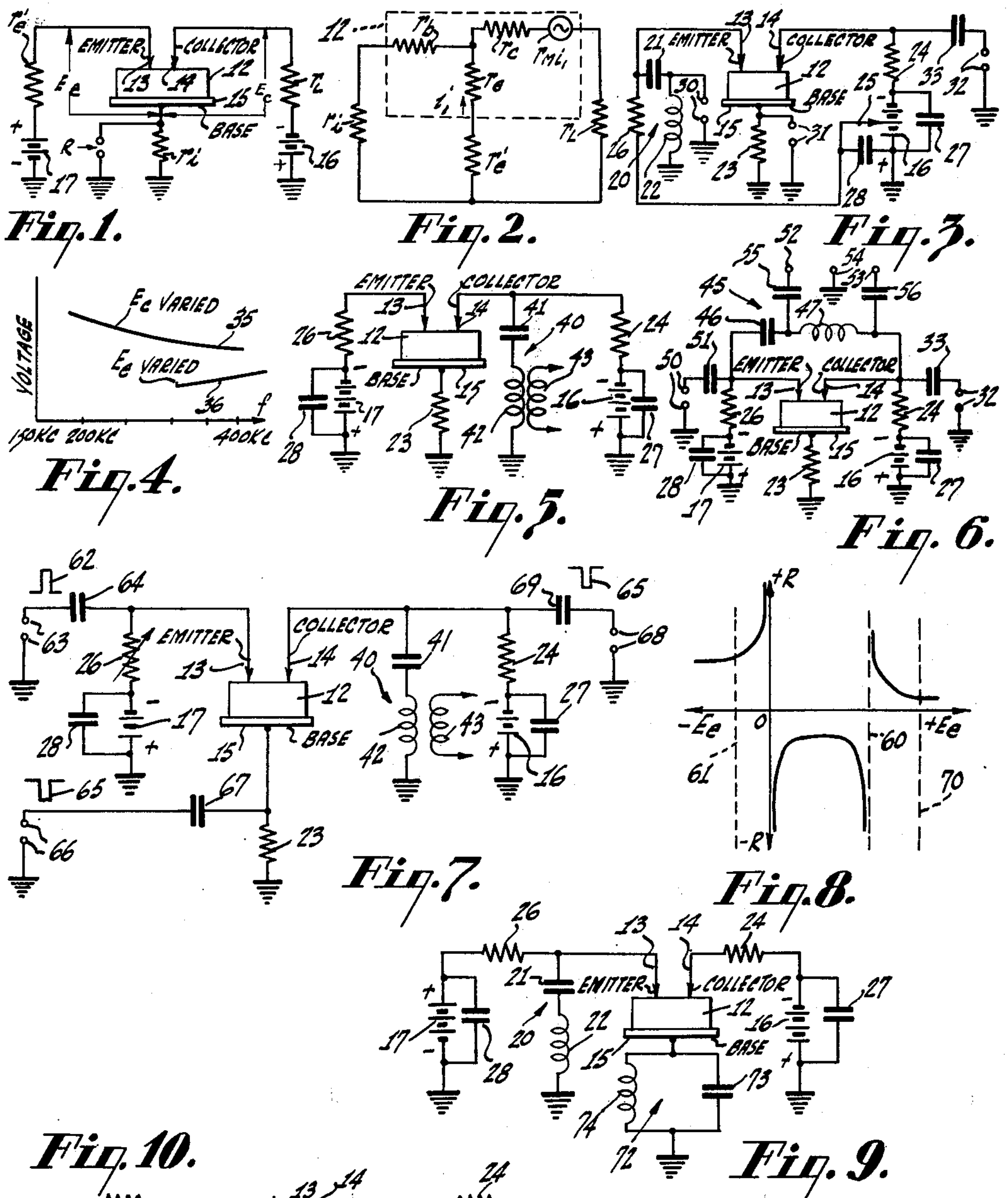
FIG. 1, FIG. 2, FIG. 3, FIG. 4, FIG. 5, FIG. 6, FIG. 7, FIG. 8, FIG. 9, FIG. 10
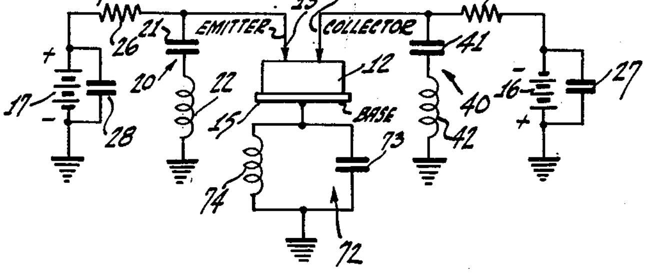
INVENTOR
EVERETT EBERHARD
BY
H. L. Newton
ATTORNEY Patented Apr. 13, 1954 2,675,474

UNITED STATES PATENT OFFICE 2,675,474

TWO-TERMINAL SINE WAVE OSCILLATOR

Everett Eberhard, Haddonfield, N. J., assignor to Radio Corporation of America, a corporation of Delaware Application May 14, 1949, Serial No. 93,303

10 Claims. (Cl. 250—36)

This invention relates generally to oscillators, and particularly relates to two-terminal sine wave oscillators including a three-electrode semi-conductor device.

The three-electrode semi-conductor is a recent development in the field of electronic amplification. This device is presently known as a "transistor," and its essential characteristics have been disclosed in a series of three letters to the "Physical Review" by Bardeen and Brattain, Brattain and Bardeen, and Shockley and Pearson which appeared on pages 230 to 233 of the July 15, 1948, issue. The new amplifier device includes a block of semi-conducting material such as silicon or germanium which is provided on one of its surfaces with two closely adjacent point electrodes which are called "emitter" and "collector electrodes and with a third electrode, called the "base" electrode, providing a large-area low-resistance contact with another surface of the semi-conductor block. The input circuit of the amplifier described in the letters referred to above is connected between the emitter and the base electrodes while the output circuit is connected between the collector and the base electrodes. In this circuit the base electrode is the common input and output electrode and may, therefore, be grounded.

It has also been pointed out in the publications referred to that a three-electrode semi-conductor device can be arranged as an oscillator. Such an oscillator having an external feedback path has been disclosed in "Radio Craft" of September 1948 on pages 24 to 25 and by C. E. Atkins in "Radio and Television News" of October 1948 in a paper beginning on page 39 (see pages 182–183). In accordance with the present invention a sine wave oscillator is provided which makes use of the negative resistance of a semi-conductor device which exists under certain operating conditions. Accordingly, the sine wave oscillator of the present invention does not require an external feedback path.

It is the principal object of the present invention to provide novel sine wave oscillators incorporating a three-electrode semi-conductor device.

A further object of the invention is to provide an oscillator of the semi-conductor type which may be triggered, for example, by a trigger pulse and which may be frequency modulated.

Another object of the invention is to provide a sine wave oscillator of the semi-conductor type of simple construction where the frequency of the sinusoidal output wave may be stabilized.

A sine wave oscillator in accordance with the present invention comprises a semi-conducting body provided with a base electrode, an emitter electrode and a collector electrode. The base electrode has a relatively large, low-resistance, non-rectifying contact with the semi-conducting body while the collector and emitter electrodes have relatively small, high-resistance, rectifying contacts with the semi-conducting body. Normally, a reverse bias is applied between the collector and base electrodes and a forward bias is applied between the emitter and base electrodes by a suitable source of potential.

In accordance with the present invention a series-resonant circuit is connected to one of the rectifying electrodes. In other words, the series-resonant circuit may be connected between the emitter electrode and ground or between the collector electrodes and ground or, alternatively, between the emitter and collector electrodes. Furthermore, an impedance element is connected between the base electrode and ground. This impedance element may consist of a parallel-resonant circuit in the manner disclosed and claimed in applicant's copending application (RCA–31,257) Serial No. 73,352, filed on January 28, 1949, entitled "Sine Wave Oscillators" and assigned to the assignee of this application. The sine wave oscillator of the present invention will oscillate by virtue of the negative resistance of the semi-conductor device which exists under predetermined operating conditions.

It is also feasible to provide such a bias voltage between the emitter and base electrodes that the oscillator will be normally quiescent. In this case, the oscillator may be caused to oscillate by applying, for example, a trigger pulse of predetermined polarity to one of its electrodes whereby the oscillator is brought into the oscillating region of its characteristics. This type of oscillator will oscillate for the duration of each trigger pulse.

The novel features that are considered characteristic of this invention are set forth with particularly in the appended claims. The invention itself, however, both as to its organization and method of operation, as well as additional objects and advantages thereof, will best be understood from the following description when read in connection with the accompanying drawing, in which:

Figure 1 is a circuit diagram of a semi-conductor amplifier provided with external impedance elements which will be referred to in explaining the operation of the sine wave oscillator of the invention;

Figure 2 is an equivalent circuit diagram of the amplifier of Figure 1;

Figure 3 is a circuit diagram of a two-terminal oscillator embodying the present invention and having a series-resonant circuit connected to the emitter electrode;

Figure 4 is a graph illustrating the variation of the frequency of the output wave obtained from the oscillator of Figure 3 with a change of the emitter or of the collector voltage;

Figure 5 is a circuit diagram of a sine wave oscillator in accordance with the invention having a series-resonant circuit connected to the collector electrode;

Figure 6 is a circuit diagram of a sine wave oscillator of the invention having a series-resonant circuit connected between the emitter and collector electrodes;

Figure 7 is a circuit diagram of a triggered sine wave oscillator in accordance with the invention;

Figure 8 is a graph illustrating the variation with the emitter voltage of the resistance looking into the base electrode of the circuit of Figure 1;

Figure 9 is a circuit diagram of a modified sine wave oscillator embodying the invention which may be used as a harmonic generator; and Figure 10 is a circuit diagram of a sine wave oscillator in accordance with the invention provided with three resonant circuits and suitable as a harmonic generator.

Referring now to the drawing, in which like components have been designated by the same reference numerals throughout the figures, and particularly to Figure 1, there is illustrated a semi-conductor amplifier. The amplifier comprises body 12 of semi-conducting material which may consist, for example, of boron, silicon, germanium, tellurium or selenium containing a small but sufficient number of atomic impurity centers or lattice imperfections as commonly employed for best results in crystal rectifiers. Germanium is the preferred material for body 12 and may be prepared so as to an electronic N type semi-conductor, as is well known. The surface of semi-conducting body 12 may be polished and etched in the manner explained in the paper by Bardeen and Brattain referred to. It is also feasible to utilize the germanium block from a commercial high-back-voltage germanium rectifier such as the type 1N44 in which case further surface treatment may not be required.

Semi-conducting body 12 is provided with emitter electrode 13, collector electrode 14 and base electrode 15. Emitter electrode 13 and collector electrode 14 are small-area, rectifying electrodes and may be point contacts consisting, for example, of tungsten or Phosphor bronze wires having a diameter of the order of 2 to 5 mils. Emitter and collector electrodes 13, 14 are ordinarily placed closely adjacent to each other either on the same surface of body 12 or on opposite surfaces thereof in which case they may be separated by a distance of from 2 to 5 mils. Base electrode 15 provides a large-area, low-resistance, non-rectifying contact with the bulk material of semi-conducting body 12.

Separate resistors are provided in the leads of each of the three electrodes. Thus, base resistor $r_i$ is arranged between base electrode 15 and ground. Collector resistor $r_L$ is provided between collector electrode 14 and battery 16 while emitter resistor $r_e'$ is connected between emitter electrode 13 and battery 17. Battery 16 is provided between ground and collector electrode 14 for the purpose of applying a relatively large reverse bias between collector electrode 14 and base electrode 15. Battery 17 connected between ground and emitter electrode 13 applies normally a small forward bias between emitter electrode 13 and base electrode 15. It is believed that the operation of the circuit of Figure 1 is sufficiently well understood so as not to require further explanation here. For further explanatory material regarding the operation of a semi-conductor amplifier, reference is made to the recent paper by Webster, Eberhard and Barton which appears on pages 5 to 16 of the March 1949 issue of RCA Review.

Figure 2 illustrates an alternating-current equivalent circuit of the amplifier of Figure 1, the equivalent circuit being described on page 9 (Figure 4) of the paper by Webster, Eberhard and Barton referred to. In the circuit of Figure 2, dotted box 12 indicates semi-conducting body 12 which may be considered as including resistor $r_b$ which appears looking into base electrode 15, resistor $r_e$ appearing looking into emitter electrode 13 and resistor $r_c$ which appears looking into collector electrode 14. In series with resistors $r_c$ and $r_L$ there is provided an impedanceless generator labeled $r_m i_1$, where $i_1$ is the current flowing into the emitter electrode as indicated in Figure 2.

A mathematical analysis of the circuits of Figures 1 and 2 shows that oscillations will occur when the following condition is met:

$$r_E \leq (r_b + r_i)\left(\frac{r_m - r_E}{r_L + r_c} - 1\right)$$

where $r_E = r_e + r_e'$. The remaining symbols occurring in the above formula have all been indicated in Figures 1 and 2. Thus, $r_b$, $r_m$ and $r_c$ are constants of the semi-conductor device enclosed within box 12 of Figure 2. These quantities may be considered as constants which, however, may be varied by selection of the operating conditions of the device. For the following analysis, however, it will be assumed that these quantities are true constants which cannot be varied. On the other hand, $r_E$, $r_i$ and $r_L$ are external resistors or include such resistors and therefore their values can be chosen at will. Normally, the right hand side of the above equation will be smaller than $r_E$ and sometimes it will actually be negative, and in either case no oscillation occurs.

Now let us consider conditions when the circuit is near oscillation. Here the quantity $$\frac{r_m - r_E}{r_L + r_c}$$

must be slightly greater than unity 1. If this is the case, it is clear that oscillation may be produced in several ways. First, it is feasible to increase the value of $r_i$ (case A), second, to decrease $r_E$ (case B) and finally to decrease $r_L$ (case C). Any one of these changes may fulfill the oscillation condition set forth in the above formula. In order to increase $r_i$ at some particular or desired frequency it is feasible to connect a parallel-resonant circuit between base electrode 15 and ground. Such a circuit will operate as a sine wave oscillator and has been disclosed and claimed in applicant's copending application above referred to and described on page 14 (Figure 10) of the publication in RCA Review previously referred to.

In accordance with the present invention either $r_E$ (case B) or $r_L$ (case C) is decreased at some particular frequency by connecting a series-resonant circuit either between emitter electrode 13 and ground or between collector electrode 14 and ground. As is well known, the impedance of a series-resonant circuit at its resonant frequency becomes zero provided the circuit does not have any resistance. A sine wave oscillator in accordance with case B has been illustrated in Figure 3.

Thus, in accordance with the present invention, series-resonant circuit 20 consisting of capacitor 21 and inductor 22 is connected between emitter electrode 13 and ground. Resistor 23 is connected between base electrode 15 and ground. Battery 16 is connected in series with resistor 24 between ground and collector electrode 14 to provide a large reverse bias between collector electrode 14 and base electrode 15. The small forward bias which is normally provided between emitter electrode 13 and base electrode 15, preferably is obtained from variable tap 25 on battery 16 which is connected to emitter electrode 13 through resistor 26. Battery 16 may be bypassed to ground by bypass capacitor 27 and bypass capacitor 28 may be provided between tap 25 and ground. The resistance of resistor 26 preferably should be high so that series-resonant circuit 20 provides the only low impedance path between emitter electrode 13 and ground.

The oscillator of Figure 3 will oscillate at a frequency determined by the resonant frequency of series-resonant circuit 20. However, as will be more fully explained hereinafter, the frequency of oscillation need not be the resonant frequency of circuit 20. A sinusoidal output wave may be derived from output terminals 30 connected across inductor 22. Alternatively, the output wave may be derived from output terminals 31 connected across base resistor 23 or from output terminals 32 effectively connected across collector resistor 24. A blocking capacitor 33 may be provided between collector electrode 14 and one of the output terminals 32.

By way of example, resistors 23, 24 and 26 may each have a resistance of 10,000 ohms. If the capacitance of capacitor 21 is 820 micromicrofarads and the inductance of inductor 22 is 595 microhenries, the oscillator has been found to oscillate at the frequency of 150 kilocycles (kc.). The resonant frequency of series-resonant circuit 20 is 228 kc. The steady collector current was 2.3 milliamperes (ma.) while the steady emitter current was .38 ma. The collector bias voltage was —53 volts, the base bias voltage —20 volts and the emitter voltage supply was slightly above the base voltage with respect to ground.

It has been found that the frequency of oscillation is a function of the emitter voltage $E_e$ and of the collector voltage $E_c$ taken with respect to the base voltage as indicated in Figure 1. Thus, curve 35 of Figure 4 indicates the variation of the frequency of the output wave of the oscillator of Figure 3 when $E_c$ is varied while $E_e$ is maintained constant. Curve 36 illustrates the frequency variation of the output wave when $E_e$ is varied while $E_c$ is maintained constant. It will be noticed that curves 35 and 36 go in opposite directions when the emitter and collector voltage is varied in the same sense. Accordingly, in order to stabilize the frequency of the output wave of the oscillator of Figure 3 both bias voltages for emitter electrode 13 and collector electrode 14 preferably are derived from the same battery 16 as shown. With this arrangement, the frequency of the output wave can be made substantially independent from variations of the bias voltage.

The sine wave oscillator of Figure 5 represents case C, that is, where $r_L$ is decreased. To this end series-resonant circuit 40 consisting of capacitor 41 and inductor 42 is connected between collector electrode 14 and ground. Otherwise, the oscillator of Figure 5 is similar to that of Figure 3. For the sake of convenience, two bias batteries 16 and 17 have been shown for applying the required bias voltages to collector electrode 14 and to emitter electrode 13. However, as pointed out before, a single battery may be provided for this purpose which will stabilize the frequency of the output wave. The output wave may be obtained in the manner explained in connection with Figure 3, or alternatively, inductor 43 may be magnetically coupled to inductor 42 for obtaining a sinusoidal output wave therefrom.

Series-resonant circuit 40 may have the circuit constants of circuit 20 of Figure 3. Resistors 23 and 24 may have a resistance of 10,000 ohms and resistor 26 may have a resistance of 1,500 ohms. The frequency of the output wave obtained with this oscillator was 63 kc. The steady collector current was 2.6 ma. and the steady emitter current was .84 ma. The collector voltage $E_c$ was —48 volts and the base voltage was —18.5 volts. The emitter voltage was approximately the same as the base voltage.

It is also feasible to combine the conditions of cases B and C. Such an oscillator has been illustrated in Figure 6. Series-resonant circuit 45 consisting of capacitor 46 and inductor 47 is connected between emitter electrode 13 and collector electrode 14. The oscillator of Figure 6 otherwise is essentially identical with the oscillators of Figures 3 and 5. The resistance of base resistor 23 should be high.

A sinusoidal output wave may be obtained from output terminals 32 connected effectively across collector resistor 24. Alternatively, an output wave may be obtained from output terminals 50 connected effectively across emitter resistor 26 through blocking capacitor 51. It is furthermore feasible to derive balanced sinusoidal output waves across inductor 47. These output waves may be obtained from output terminals 52 or 53 which are balanced with respect to grounded terminal 54 and connected to opposite terminals of inductor 47 through blocking capacitors 55 and 56, respectively.

In the oscillator of Figure 6, resistors 23, 24 and 26 may, for example, each have a resistance of 10,000 ohms. Series-resonant circuit 45 may have the same circuit constants as does circuit 20 of Figure 3. In this case the frequency of the output wave was 69 kc. The steady collector current was 1.9 ma. and the steady emitter current was .8 ma. The collector voltage $E_c$ was —34 volts, the base voltage was —12.6 volts and the emitter voltage —13.2 volts.

Figure 7 illustrates a triggered oscillator in accordance with the invention. The oscillator of Figure 7 is substantially identical with that of Figure 5, that is, series resonant circuit 40 is provided between collector electrode 14 and ground. However, the voltage of battery 17 and the resistance of resistor 26 are chosen in such a manner that the oscillator is normally quiescent. For a better understanding of the operation of the oscillator of Figure 7, reference is made to Figure 8. Figure 8 illustrates the resistance R which appears looking into base electrode 15 as illustrated in Figure 1. The resistance R is a function of the emitter bias voltage $E_e$. Thus, between the zero line and dotted line 60 of Figure 8 the resistance R is negative. This is the region where the device will oscillate. To the left of the zero line and to the right of dotted line 60 the resistance R is positive.

Let it now be assumed that in the circuit of Figure 7 a negative bias voltage $E_e$ corresponding to dotted line 61 of Figure 8 is impressed between emitter electrode 13 and base electrode 15. This will normally render the oscillator quiescent. In order to cause the oscillator to oscillate the bias voltage $E_e$ must be increased in a positive direction so that it will be somewhere in the region limited by the zero line and dotted line 60.

To this end a positive trigger pulse 62 may be impressed on input terminals 63 connected between ground and emitter electrode 13 through coupling capacitor 64. If trigger pulses 62 are of sufficient amplitude, the oscillator will develop a burst of sinusoidal waves for the duration of the trigger pulse. Instead of impressing a positive trigger pulse 62 on emitter electrode 13 it is feasible to impress a negative trigger pulse 65 on either base electrode 15 or on collector electrode 14. To this end a negative trigger pulse 65 may be impressed through input terminals 66 and coupling capacitor 67 between base electrode 15 and ground, that is, across base resistor 23. Alternatively, a negative trigger pulse 65 may be impressed through input terminals 68 and coupling capacitor 69 between collector electrode 14 and ground, that is, effectively across collector resistor 24. It will be obvious that a reduction of the base voltage is equivalent to an increase of the emitter voltage. Similarly, a decrease of the collector voltage will cause a larger current flow through base resistor 23 so that the base voltage decreases, thereby to increase the emitter voltage with respect to that of base electrode 15.

It is furthermore feasible to bias emitter electrode 13 positively with respect to base electrode 15 corresponding to dotted line 70 of Figure 8. The positive bias must be sufficiently high so that the oscillator is normally quiescent, that is, the bias potential must be above that indicated by dotted line 60. In this case, the oscillator of Figure 7 may be triggered by a negative pulse impressed through terminals 63 on emitter electrode 13 or by a positive trigger pulse which may be impressed on either terminals 66 or 68 thereby to render either base electrode 15 or collector electrode 14 more positive. The trigger pulses should be of sufficient amplitude to render the oscillator oscillating, that is, to bring the emitter bias voltage within the region limited by the zero line and dotted line 60. It is to be understood that the oscillators of Figures 3 and 6 may be triggered in the same manner as shown in connection with Figure 7.

Furthermore, instead of triggering the oscillator of Figure 7 with a trigger pulse the emitter bias voltage $E_e$ may also be varied by varying the resistance of resistor emitter 26. This may be done either mechanically or electronically by replacing variable resistor 26 with a suitable vacuum tube or transistor device having a controllable resistance. Thus, by varying the resistance of resistor 26 through a sufficiently large range, a normally quiescent oscillator may be made to oscillate. On the other hand, if the device is biased to oscillate, the resistance of resistor 26 may be varied within the region limited by the zero line and by dotted line 60 of Figure 8. In that case, the frequency of the sinusoidal output wave may be frequency modulated as will be evident from an inspection of Figure 4. Alternatively, collector resistor 24 may be varied within the oscillating region to frequency modulate or to vary the frequency of the output wave.

It should further be pointed out that frequency modulation may easily be accomplished by inserting a modulating voltage in series with resistor 26 or with resistor 24 providing that the semiconductor device is operating in the region of oscillation. This should be clearly evident from the curves of Figure 4.

The oscillator of Figure 9 is provided with two tuned circuits. Thus, series-resonant circuit 20 may be provided between emitter electrode 13 and ground in the manner illustrated in Figure 3. Furthermore, parallel-resonant circuit 72 consisting of capacitor 73 and inductor 74 may be connected between base electrode 15 and ground. It has already been pointed out that such a parallel-resonant circuit connected between base electrode 15 and ground has been disclosed and claimed in applicant's copending application above referred to. Resonant circuits 20 and 72 may either be made to resonate at the same frequency or one circuit may be tuned to a harmonic of the other circuit. In the latter case, the circuit of Figure 9 may be used as a harmonic generator and an output wave at the harmonic frequency may be derived from the resonant circuit tuned to the harmonic frequency. Preferably, however, both circuits 20 and 72 are tuned to the same frequency.

The oscillator of Figure 10 includes three resonant circuits 20, 40 and 72. Series-resonant circuit 20 is connected between emitter electrode 13 and ground while series-resonant circuit 40 is connected between collector electrode 14 and ground. Finally, parallel-resonant circuit 72 is connected between base electrode 15 and ground. The three resonant circuits 20, 40 and 72 may either be tuned to the same frequency or one may be tuned to a harmonic of the frequency to which the other two circuits are tuned. In the latter case, a harmonic generator is provided and an output wave at the harmonic frequency may be derived from that circuit which is tuned to the harmonic frequency.

There has thus been disclosed a novel two-terminal sine wave oscillator incorporating a semi-conductor device. The sine wave oscillator can be arranged to be normally oscillating or it may be biased to be normally quiescent in which case it may be triggered by the application of trigger pulses or by other means. The frequency of the output wave may be varied by varying one of the voltages applied to its electrodes. Finally, the frequency of the output wave may be stabilized either by maintaining the supply voltages constant or by deriving them from the same source of potential.

What is claimed is:

1. A sine wave oscillator comprising a semiconducting body, a base electrode, an emitter electrode and a collector electrode contacting said body, means for applying a reverse bias between said collector and base electrodes and for applying a predetermined bias between said emitter and base electrodes, an impedance element connected between said base electrode and a point of substantially fixed potential, a resistor connected between said emitter electrode and a point of substantially fixed potential, a series-resonant circuit connected directly across said resistor, and means for deriving a sinusoidal output wave across the inductance element of said circuit.

2. A sine wave oscillator comprising a semiconducting body, a base electrode, an emitter electrode and a collector electrode in contact with said body, means for applying a reverse biasing potential between said collector and base electrodes and for applying a forward biasing potential between said emitter and base electrodes, an impedance element connected between said base electrode and a point of substantially fixed potential, a resistor connected between said collector electrode and a point of substantially fixed potential, and a series-resonant circuit connected in shunt with said resistor.

3. A sine wave oscillator comprising a semi-conducting body, a base electrode in contact with said body, an emitter electrode and a collector electrode in rectifying contact with said body, means for applying a reverse biasing potential between said collector and base electrodes and for applying a forward biasing potential between said emitter and base electrodes, an impedance element connected between said base electrode and a point of substantially fixed potential, and a pair of series-resonant circuits, each being connected between one of said rectifying electrodes and a point of substantially fixed potential.

4. A sine wave oscillator comprising a semi-conducting body, a base electrode, an emitter electrode and a collector electrode in contact with said body, means for applying a reverse biasing potential between said collector and base electrodes and for applying a predetermined biasing potential between said emitter and base electrodes, a parallel-resonant circuit connected between said base electrode and a point of substantially fixed potential, and a series-resonant circuit connected in circuit with said emitter electrode.

5. A sine wave oscillator comprising a semi-conducting body, a base electrode in contact with said body, an emitter electrode and a collector electrode in rectifying contact with said body, means for applying a reverse biasing potential between said collector and base electrodes and for applying a forward biasing potential between said emitter and base electrodes, a parallel resonant circuit connected between said base electrode and a point of substantially fixed potential, a pair of resistors connected individually between each of said rectifying electrodes and a point of substantially fixed potential, and a pair of series-resonant circuits, each being connected effectively across one of said resistors.

6. A triggered oscillator comprising a semi-conducting body, a base electrode in contact with said body, an emitter electrode and a collector electrode, each being in rectifying contact with said body, means for applying such biasing potentials to said electrodes that said oscillator will normally not oscillate, an impedance element connected between said base electrode and a point of fixed potential, a series-resonant circuit connected in circuit with one of said rectifying electrodes, and means for varying the potential between two of said electrodes in such a manner as to cause said oscillator to oscillate.

7. A triggered oscillator comprising a semi-conducting body, a base electrode in contact with said body, an emitter electrode and a collector electrode, each being in rectifying contact with said body, means for applying a reverse biasing potential between said collector and base electrodes and for applying a predetermined biasing potential between said emitter and base electrodes so that said oscillator will normally not oscillate, said means for applying including a source of potential and a resistor connected serially between a point of fixed potential and said emitter electrode, an impedance element connected between said base electrode and said point of fixed potential, a series-resonant circuit connected to one of said rectifying electrodes, and means for varying the resistance of said resistor so as to cause said oscillator to oscillate.

8. A triggered oscillator comprising a semi-conducting body, a base electrode in contact with said body, an emitter electrode and a collector electrode, each being in rectifying contact with said body, means for applying a reverse biasing potential between said collector and base electrodes and for applying a predetermined biasing potential between said emitter and base electrodes so that said oscillator will normally not oscillate, an impedance element connected between said base electrode and a point of fixed potential, a series-resonant circuit connected in circuit with one of said rectifying electrodes, and means for applying trigger pulses between one of said electrodes and said point of fixed potential, said trigger pulses having such a polarity as to cause said oscillator to oscillate substantially for the duration of each trigger pulse.

9. A triggered oscillator comprising a semi-conducting body, a base electrode in contact with said body, an emitter electrode and a collector electrode, each being in rectifying contact with said body, means for applying a reverse biasing potential between said collector and base electrodes and for applying a predetermined biasing potential between said emitter and base electrodes so that said oscillator will normally not oscillate, a resistor connected between said base electrode and a point of fixed potential, a series-resonant circuit connected in circuit with one of said rectifying electrodes, and means for applying trigger pulses between one of said electrodes and said point of fixed potential, said trigger pulses having such a polarity as to cause the resistance looking into said base electrode to become negative, whereby said oscillator is caused to oscillate substantially for the duration of each trigger pulse.

10. An oscillator comprising a semi-conducting body, a base electrode in contact with said body, an emitter electrode and a collector electrode, each having a small-area contact with said body, means for applying a reverse biasing potential between said collector and base electrodes and for applying a predetermined biasing potential between said emitter and base electrodes, an impedance element connected between said base electrode and a point of fixed potential, a series-resonant circuit connected in circuit with one of said rectifying electrodes, an output connection coupled to one of said electrodes for deriving a sinusoidal output wave, and means for varying one of said biasing potentials, whereby the frequency of said output wave is varied.

References Cited in the file of this patent

UNITED STATES PATENTS

| Number | Name | Date |
|---|---|---|
| 2,469,569 | Ohl | May 10, 1949 |
| 2,476,323 | Rack | July 19, 1949 |